(12) United States Patent
Venable

(10) Patent No.: US 6,934,052 B2
(45) Date of Patent: Aug. 23, 2005

(54) METHOD FOR IMAGE LAYOUT USING ENERGY MINIMIZATION

(75) Inventor: Dennis L. Venable, Marion, NY (US)

(73) Assignee: Xerox Corporation, Stamford, CT (US)

( * ) Notice: Subject to any disclaimer, the term of this patent is extended or adjusted under 35 U.S.C. 154(b) by 687 days.

(21) Appl. No.: 09/946,268

(22) Filed: Sep. 5, 2001

(65) Prior Publication Data

US 2002/0051208 A1 May 2, 2002

Related U.S. Application Data

(62) Division of application No. 09/004,286, filed on Jan. 8, 1998.

(51) Int. Cl.$^7$ ............................................. H04N 1/387
(52) U.S. Cl. ..................... 358/1.18; 358/1.2; 358/1.12; 358/450
(58) Field of Search ................................. 358/1.2, 1.12, 358/1.18, 450, 452, 540; 345/115, 118

(56) References Cited

U.S. PATENT DOCUMENTS

| | | | |
|---|---|---|---|
| 4,928,252 A | * | 5/1990 | Gabbe et al. ................. 358/1.2 |
| 5,202,670 A | | 4/1993 | Oha |
| 5,224,181 A | | 6/1993 | Tsutsumi |
| 5,289,570 A | | 2/1994 | Suzuki |
| 5,381,523 A | | 1/1995 | Hayashi |
| 5,438,512 A | | 8/1995 | Mantha et al. |
| 5,485,568 A | | 1/1996 | Venable et al. |

FOREIGN PATENT DOCUMENTS

| | | |
|---|---|---|
| EP | 0577924 | 1/1994 |
| EP | 0784294 | 7/1997 |
| JP | 63274267 | 11/1998 |

* cited by examiner

Primary Examiner—Thomas D. Lee

(57) ABSTRACT

A novel method is disclosed for laying out a plurality of rectangles onto a bounding box area, where bboxArea represents a total area of the bounding box and totalRectArea represents the sum of the areas of all the rectangles. The method comprises the steps of: first adjusting all rectangles to a specified aspect ratio and then computing a sum of areas of all rectangle intersections (overlap) occurring as a result of said arrangement. Next, the function blackArea=totalRectArea−overlap is used to approximate the black area and all non-overlapping spaces remaining between the arranged rectangles are computed by: WhiteSpace=bboxArea−blackArea. Then, for the current arrangement, an energy function E=whiteSpace+(overlapPenlalty * overlap) is calculated and for each energy function, a state probability function is calculated such that: $Pr=\exp(-(E_{new}-E_{old})/kT)$, where $E_{old}$ is the energy computed for the previously accepted state, $E_{new}$ is the energy calculated for the current state, T is a control parameter from $T_0-T_{end}$, and k is a constant. Typically, initial value of $T_0=100$ and $T_{end}=0.0$ and the overlapPenalty has an initial value of 100. The value for the control parameter T is subsequently lowered by a fraction of its present value using the relationship: $T_{N+1}=T_N *$ 0.95. A random number between 0 . . 1 is then selected and if the random number is less than the value of Pr then the new state $E_{new}$ is accepted thus new states are always accepted where $E_{new}$ is less than $E_{old}$. The rectangles are again randomly arranged on the bounding box area and the method repeats itself until either $T_{end}$ is reached or the value of Pr is within acceptable limits.

4 Claims, 3 Drawing Sheets

METHOD FOR IMAGE LAYOUT USING ENERGY MINIMIZATION

This Application is a Division of Ser. No. 09/004,286 filed on Jan. 8, 1998.

FIELD OF THE INVENTION

This invention is generally related to layout techniques for digital images and, more particularly, to an automatic image layout technique which allows a collection of digital images to be formatted in a single contact sheet-like layout for rapid viewing and cataloging.

BACKGROUND OF THE INVENTION

Computer based document handling systems are generally divided into four broad categories: text editors and word processing systems; formatters; syntax directed editors; and specialized tools. Most systems have features from more than one of these four broad categories in addition to any image processing necessary for editing images. An image processor reads an image of a document using an image input unit, stores it in a memory in the form of image data, and subjects the stored image data to editing operations such as addition and deletion. As one of the editing operations, part of the read document is electronically cut and pasted to a predetermined place in another document. In such an electronic cutting and pasting operation, the document image to be cut and the destination document image are displayed either on a single display unit or on separate display units, and a cutting image portion in the document to be cut and a pasting place in the pasting (destination) document are similarly specified by a mouse, for example. In the related art image processor, the cutting image portion and the pasting place are specified by the operator by selecting appropriate positions while looking at the screen. For this reason, it is not possible to cut or paste figures precisely. Particularly, shifts in position are noticeable when the same patterns must be juxtaposed. U.S. Pat. No. 5,224,181 to Tsutsumi entitled "Image processor" and U.S. Pat. No. 5,202,670 to Oha entitled "Image Processing Apparatus" both discuss image processing generally.

For documents in which presentational considerations are important, the documents must be submitted to a formatter for preparation prior to presentation. Formatters are non-interactive tools that process a document to produce either a display independent or a device dependent layout specification. Documents are submitted to formatters in the form of descriptions on file and they carry out the processing and return the overall results after a certain period of time. High-level formatters work on the basis of a logical description of the document. The user is not required to specify the presentation details desired. The user deals with the logical organization of the document, i.e., the different types of elements that appear in the document, such as, for example, section, paragraph, heading, summary, etc. The formatter handles the layout presentation of these elements. Low-level formatters make it possible to include commands within the document description to enable changes in other characteristics of the document, such as, for example, font, spacing, margins and justification. U.S. Pat. No. 5,438,512 to Mantha et al. entitled "Method and apparatus for specifying layout processing of structured documents" is directed to high-level formatters. Mantha discloses a method and apparatus for specifying layout processing of logically structured documents in computer document handling systems. The Mantha method and apparatus allow the specification of the generic logical structure of the structured document in terms of relational attribute grammars.

Most interactive systems allow the user to see the layout of a document as it is being prepared. These interactive systems also separate the logical structure of the documents from the specification of the presentation details. Typically, interactive systems as well as high-level formatters, use a grammatical notation to describe the logical structure of documents. These logical structures are mostly hierarchical in nature and tree structures are used to represent them.

The need for document processing devices which can generate a layout structure of a document by applying a template (i.e., rules for layout) to a logical structure of the document are apparent with the wide use of microprocessors to process and properly render electronically created or digitally scanned documents, or images as more specifically referred to at times. In general, both of the logical development and the layout of an actual output document are important factors of the document. However, the layout is not necessarily important in the process of producing a document. For example, although the layout is necessary once the contents of a document are determined, in some cases the layout is not considered in the initial stage of document production where the logical development is not clear yet. Furthermore, different layouts may be required for one logical development in some cases; for instance, when the same document needs to be distributed to a plurality of persons or sections. Recognizing the above distinction, there have been proposed techniques of generating a layout representing such structures called "layout structure" from a structure called "logical structure" which represents the chapter construction of a document. The process of generating a layout structure from a logical structure is called a layout process, and is performed by a program (layout processing program) that is incorporated in document processing systems.

In order to generate various forms of layout structures from the same logical structure, the operation of a layout processing program needs to be modified. However, in general, a program itself cannot be modified properly by ordinary users because the modification needs expert knowledge. For this reason, there has been employed a technique of altering a program by using parameters such as "page size is A4" and "double column setting" for textual documents. However, according to this technique, the kinds of specifiable parameters are limited to ones that are preset in the program. Furthermore, to control the operation of a layout processing program having many functions it is necessary to specify a large number of parameters which precludes ordinary users from using such a program. To solve the above problems, there have been proposed techniques of controlling a layout processing program by using, rather than simple parameters, a data structure representing a layout template. One of those techniques is a "generic layout structure" prescribed in the international standards "ODA" (ISO8613, Information Processing-Text and Office Systems-Office Document Architecture (ODA) and Interchange Format (1989)). The ODA only sets forth data structures for representing document structures and guidelines for their use, and does not describe actual layout processes. However, it is apparent that the following functions are needed to perform layout operations according to the ODA. The layout process having the following functions is hereinafter referred to as "ODA layout process."

(1) Layout processing function based on a layout template (generic layout structure)

(2) Layout process selecting function (top-down or bottom-up)

(3) Reuse of a layout result (4) Category-based layout processing function

The functions (mechanisms) (1)–(4) are not necessarily effected individually, but could be combined when desired. Combining the functions can improve the efficiency of the layout process.

U.S. Pat. No. 5,381,523 issued to Hayashi entitled "Document processing device using partial layout templates" discloses partial layout templates that are prepared for respective partial logical structures of a hierarchical logical structure of a document. Each partial layout template expresses rules for producing a layout of the corresponding partial logical structure. A partial layout generator produces a partial layout structure by recursively calling itself or by calling a content layout system while referring to the partial layout template, and pours the generated partial layout structure into a lowest-rank frame. A layout of the entire logical structure is produced by sequentially performing the partial layout operations. Hayashi also only relates to a document processing device which can generate a layout structure of a single document by applying a template (i.e., rules for layout) to a logical structure of the single document.

With the growing interest in digital photography and the necessity to lay out and view several digital images as a document, a need still exists for a document/image structuring process which would allow a microprocessor to organize the layout of several images on a sheet-like medium. Needed is a technology that enables a user to gang scan (several images on the scanner platen at once) many images and automatically locate each image, crop them, and correct any rotation errors associated with each image. Resulting images can then be stored individually or as a structured image with a user-defined or simple row-column layout which can be created. A detailed description of Structured Images is provided in U.S. Pat. No. 5,485,568 issued to Venable et al. on Jan. 16, 1996, entitled "Structured Image (SI) format for describing complex color raster images."

There is a need for technology that will automatically generate the digital equivalent of a photographers contact print sheet in which the segmented images will be scaled and distributed on a resulting page such that each image is scaled as large as possible wherein there is a minimum of white space remaining on the rendered page.

As a first constraint to adequately addressing such a need, all images must be scaled by the same amount, i.e., the relative size of each segmented image stays the same. A second constraint should be in forming the equivalent of a bounding box with minimum white space (space uncovered by an rectangle). Once a solution to the above constraints are found, many images may be scaled by the appropriate amount to make a bounding box the same size as the printable area of paper. It is a feature of the present invention to effectively address the constraints in order to accomplish the desired results described above.

Other advantages and salient features of the invention will become apparent from the detailed description which, taken in conjunction with the drawings, disclose the preferred embodiments of the invention.

SUMMARY OF THE INVENTION

Disclosed is the technology that enables a user to "gang scan" (to scan several images on the scanner platen at once) many images and automatically locate each image, crop them, and correct any rotation errors associated with each image. Resulting images can be stored individually or as a structured image with a user-defined or simple row-column layout which can be automatically created with a microprocessor based system. The invention enables the system to automatically generate the digital equivalent of a photographers contact print sheet onto which the segmented images will be scaled and distributed such that each image on the resulting page is scaled as large as possible and wherein there is a minimum of white space remaining on the rendered page.

A novel method is disclosed for laying out a plurality of rectangles onto a bounding box area, where bboxArea represents a total area of the bounding box and totalRectArea represents the sum of the areas of all the rectangles. The method comprises the steps of: first adjusting all rectangles to a specified aspect ratio and then computing a sum of areas of all rectangle intersections (overlap) occurring as a result of said arrangement. Next, the function blackArea= totalRectArea−overlap is used to approximate the black area and all non-overlapping spaces remaining between the arranged rectangles are computed by: WhiteSpace= bboxArea−blackArea. Then, for the current arrangement, an energy function E=whiteSpace+(overlapPenlalty * overlap) is calculated and for each energy function, a state probability function is calculated such that: $Pr=\exp(-(E_{new}-E_{old})/kT)$, where $E_{old}$ is the energy computed for the previously accepted state, $E_{new}$ is the energy calculated for the current state, T is a control parameter from $T_0$–$T_{end}$, and k is a constant. Typically, initial value of $T_0$=100 and $T_{end}$=0.0 and the overlapPenalty has an initial value of 100. The value for the control parameter T is subsequently lowered by a fraction of its present value using the relationship: $T_{N+1}=T_N^*$ 0.95. A random number between 0 . . 1 is then selected and if the random number is less than the value of Pr then the new state $E_{new}$ is accepted thus new states are always accepted where $E_{new}$ is less than $E_{old}$. The rectangles are again randomly arranged on the bounding box area and the method repeats itself until either $T_{end}$ is reached or the value of Pr is within acceptable limits.

DESCRIPTION OF THE DRAWINGS

The salient features and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

Figure 1:
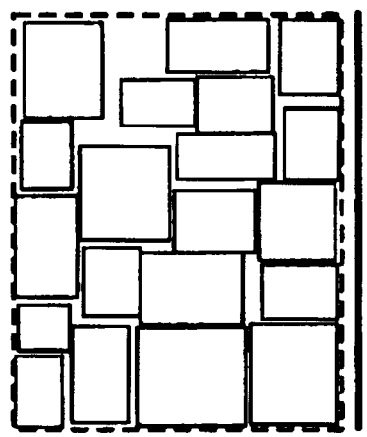
FIG. 1 is an example of the resulting rectangle layout based on an aspect ratio of 1.29. There are 20 original rectangles representing images with dimensions randomly distributed between 20 and 50. The percentage of white space on this "page" is 18%.

The solution to this problem is based on combinatorial minimization algorithm Simulated Annealing (see Numerical Recipes in C, pp. 343–352). Briefly, simulated annealing is an energy minimization algorithm useful in situations where the space of all possible solutions is discreet but very large such that it is impractical to exhaustively search the entire space for the absolute minimum. Simulated annealing is less likely to be trapped in local minima than other minimization algorithms. To use simulated annealing, an energy function that is based on the system constraints must be defined. At random, new configurations of the system are generated and the energy function for each configuration is evaluated. The probability of accepting the new state is calculated by evaluating the function:

$$Pr=exp(-(E_{new}-E_{old})/kT),$$

where $E_{old}$ is the energy of the previous accepted state, $E_{new}$ is the energy of the new state, T is a control parameter analogous to temperature, and k is a constant. A random number between (0. . . 1) is then obtained using a uniform random number generator. If the random number is less than Pr, the new state is accepted. If $E_{new}$ is less than $E_{old}$, then Pr is greater than unity and the new state will be accepted. Therefore, new states with lower energies than previous states are always accepted. If $E_{new}$ is greater than $E_{old}$, the new state will be accepted with a probability given by Pr. This scheme of always taking downhill steps in the energy function and sometimes taking uphill steps is known as a Metropolis algorithm.

In simulated annealing, the temperature T is periodically lowered according to an annealing schedule. The period between temperature drops is an epoch. The amount by which the temperature is lowered is usually a fraction of the current value, e.g., $T_{N+1}=T_N* 0.95$. The process usually begins at an initial temperature $T_0$ and ends when the temperature reaches a temperature $T_{end}$ or if some other measure of convergence is satisfied. This has the affect of making uphill changes less likely as the algorithm progresses.

In our application, the positions of all rectangles define the configuration space. To generate new configurations from previous configurations, we define 5 allowed operations. We do not claim these as the only operation possible; these are the ones we have worked with:

1) swap the positions of two rectangles
2) move a rectangle
3) move a rectangle immediately to the right of another rectangle
4) move a rectangle immediately to the left of another rectangle
5) rotate a rectangle by 90 degrees.

The algorithm will work using only the Move operation, but the use of additional operations can increase the likelihood of stepping out of local minima. Use the rotate operation only if the intended application allows the rectangles (images) to be rotated. The choice of which operation is applied to generate a new configuration, and which rectangles are to be adjusted, is determined by a uniform random number generator.

The energy function must be defined such that the function is minimized when all of the constraints are met. The energy function we define is:

$$E=whiteSpace+overlapPenalty* overlap,$$

where overlapPenalty is a parameter, typically~100.0 in our test; overlap is the area of the intersection of all the rectangles. The actual total overlap area is difficult to calculate (involving calculating the overlapping regions of a set of polygons); we use an approximation that achieves the desired effect:

```
overlap = 0;
    for (i=0; i<nrects-1; ++i)
        for (j=i+1; j<nrects; ++j)
            overlap += CalcIntersection(&rects[i], &rects [j]);
```

This code segment evaluates overlap as the total sum of the intersection area between all rects. The "CalcIntersection" procedure calculates the intersection area between two rectangles and the code segment loops over this procedure for all rectangles. In the limit where no rectangles overlap, the value of overlap is zero which matches the true total overlap. In the limit where all rectangles overlap, the value of overlap is large. However, since the constraint is to minimize overlap, having a large overlap contribution when all rectangles coincide is OK. In other words, this approximation to the total overlap does the right thing.

WhiteSpace is a measure of the amount of white space left on the page in the given state. whiteSpace is defined by:

$$WhiteSpace=bboxArea-blackArea,$$

where bboxArea is the total area of the bounding box (the bounding box of all rectangles adjusted to the specified aspect ratio); blackArea is the area of the union of all rectangles. blackArea is approximated by:

$$blackArea=totalRectArea-overlap,$$

where totalRectArea is the sum of the areas of all rectangles.

An epoch is typically 500 cycles with an initial temperature $T_0=100.0$, and ending temperature $T_{end}=0.01$, and fractional temperature change of 0.975. The simulated annealing process requires an initial configuration of the rectangles. In all of our examples, the initial configuration is such that the upper left hand corner of all rectangles is at coordinate (0,0).

FIG. 1 is an example of the resulting rectangle layout based on an aspect ratio of 1.29. There are 20 original rectangles with dimensions randomly distributed between 20 and 50. The percentage of white space on this "page" is 18%.

Figure 2:
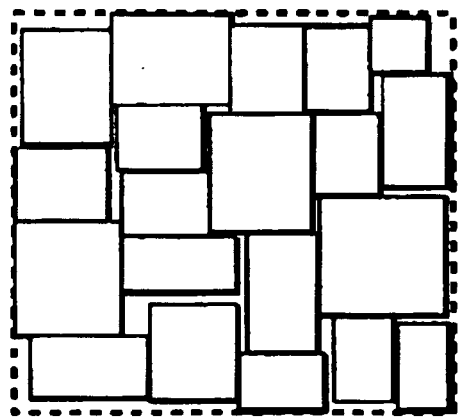
FIG. 2 illustrated the same data of FIG. 1 processed without the constraint of maintaining the aspect ratio. The percentage white space is 13.2%.

In FIG. 2, the same data was processed but without the constraint of maintaining the aspect ratio. The percentage white space is 13.2%.

Figure 3:
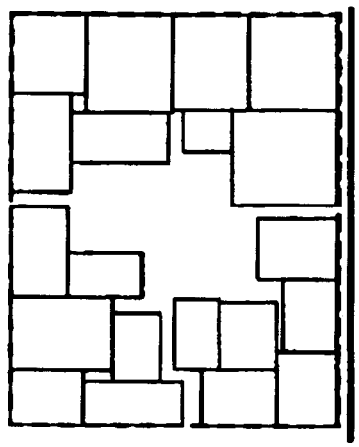
FIG. 3 illustrates an additional constraint specified having the effect of opening the middle of the page and driving rectangles toward the outside edge. The aspect ratio constraint is included here. Percentage white space is 23%.

In FIG. 3 an additional constraint was specified such that a penalty was added to the energy function for rectangles positioned near the center of the page. This additional constraint has the effect of opening the middle of the page and driving rectangles toward the outside edge. The aspect ratio constraint is included here. Percentage white space is 23%.

Figure 4:
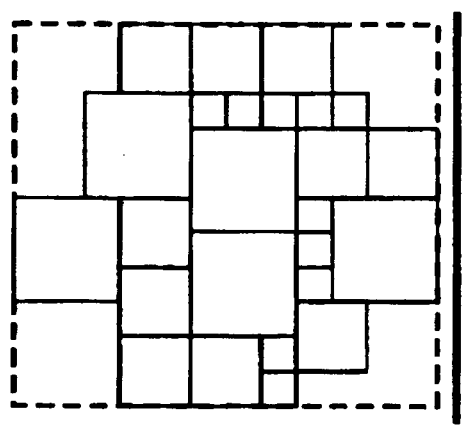
FIG. 4 illustrates the rectangle layout where the opposite penalty from FIG. 3 is set, i.e., rectangles were penalized for being toward the edge. The percentage white space is 28%.

In FIG. 4, the opposite penalty is set, i.e., rectangles were penalized for being toward the edge. The effect is to position rectangles closer to the center. The aspect ratio is not constrained. The percentage white space is 28%.

It is possible to add additional constraints to the energy function. Some constraints may be applied for artistic purposes; for example, the results shown in FIG. 4. It may be desirable to have the rectangles aligned in rows or columns.

In summary, what is disclosed is a novel method for laying out a plurality of rectangles onto a bounding box area, where bboxArea represents a total area of the bounding box and totalRectArea represents the sum of the areas of all the rectangles. The method comprises the steps of: first adjusting all rectangles to a specified aspect ratio and then computing a sum of areas of all rectangle intersections (overlap) occurring as a result of said arrangement. Next, the function blackArea=totalRectArea−overlap is used to approximate the black area and all non-overlapping spaces remaining between the arranged rectangles are computed by: WhiteSpace=bboxArea−blackArea. Then, for the current arrangement, an energy function E=whiteSpace+ (overlapPenalty * overlap) is calculated and for each energy function, a state probability function is calculated such that: $Pr=\exp(-(E_{new}-E_{old})/kT)$, where $E_{old}$ is the energy computed for the previously accepted state, $E_{new}$ is the energy calculated for the current state, T is a control parameter from $T_0-T_{end}$, and k is a constant. Typically, initial value of $T_0=100$ and $T_{end}=0.0$ and the overlapPenalty has an initial value of 100. The value for the control parameter T is subsequently lowered by a fraction of its present value using the relationship: $T_{N+1}=T_N* 0.95$. A random number between 0 . . 1 is then selected and if the random number is less than the value of Pr then the new state $E_{new}$ is accepted thus new states are always accepted where $E_{new}$ is less than $E_{old}$. The rectangles are again randomly arranged on the bounding box area and the method repeats itself until either $T_{end}$ is reached or the value of Pr is within acceptable limits.

Figure 5:
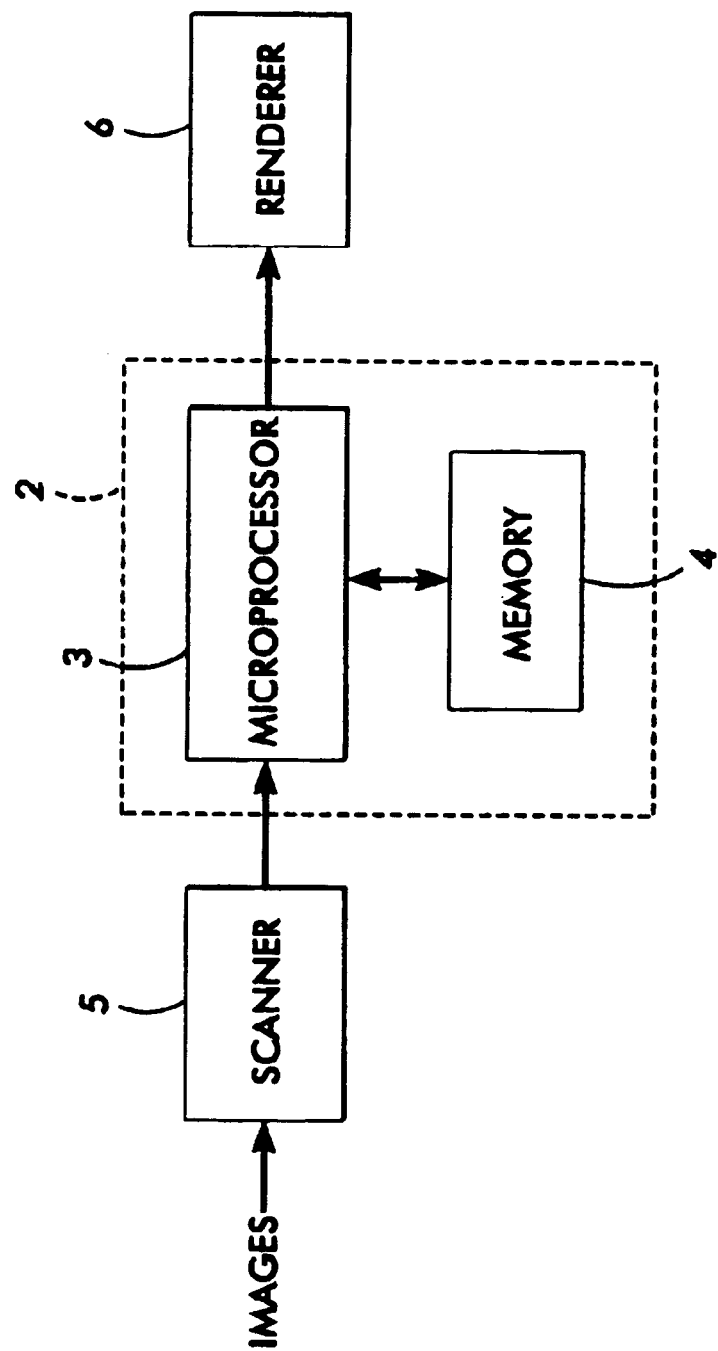
FIG. 5 illustrates a block diagram of the system which is used to implement the invention.

FIG. 5 illustrates a typical system 1 that would implement the above-process. Within the computer system 2 a microprocessor 3 executes the formatting algorithm which is stored in memory 4. A scanner 5 is used to capture several images, either all at once from a single platen or individually. The digital images are then automatically organized by the microprocessor 2 with the inventive process recalled from memory 4 by the microprocessor, and the result is a contact sheet-like representation of the images which may also be stored in memory 4, or rendered by a printer 6.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method for laying out a plurality of rectangles within a bounding box area to form a layout, the layout having a current configuration, comprising:
   (a) adjusting all rectangles to a specified aspect ratio;
   (b) computing an overlap sum of all areas corresponding to a common area of overlapping rectangles occurring as a result of the arrangement;
   (c) approximating a black area value, the black area value being equal to a difference between a total area value and the computed overlap sum, the total area value being the sum of the areas of all the plurality of rectangles;
   (d) calculating a white space value representing non-overlapping space remaining between the arranged rectangles, the white space value being equal to a difference between a bounding box area value and the black area value, the bounding box area value being equal a total area of the bounding box;
   (e) calculating an energy function, for the current configuration, the energy function being equal to the sum of the calculated white space value and an overlap product, the overlap product being a product of the computed overlap sum and a predetermined penalty value;
   (f) calculating a state probability function, the state probability function being equal to an exponential function of a negative of an energy function power, the energy function power being equal to an energy difference divided by a predetermined control parameter, the energy difference being a difference between a current calculated energy function and a previously calculated energy function;
   (g) determining if the calculated state probability function is within predetermined limits;
   (h) accepting the current configuration when it is determined that the calculated state probability function is within the predetermined limits;
   (i) lowering a value for the predetermined control parameter by a predetermined fraction when it is determined that the calculated state probability function is outside the predetermined limits;
   (j) obtaining a random value between zero and 1 when it is determined that the calculated state probability function is outside the predetermined limits;
   (k) determining if the random value is less than the value of the calculated state probability function when it is determined that the calculated state probability function is outside the predetermined limits;
   (l) making the previously calculated energy function equal to the current calculated energy function if the random value is less than the value of the calculated state probability function; and
   (m) randomly arranging the rectangles within the bounding box area when it is determined that the calculated state probability function is outside the predetermined limits and the random value is less than the value of the calculated state probability function.

2. The method as in claim 1, wherein the predetermined penalty value represents a constraint added for rectangles about a center of the bounding box, thereby effectively driving the rectangles toward outside edges of the bounding box.

3. The method as in claim 1, wherein the predetermined penalty value represents a constraint added for rectangles near outside edges of the bounding box, thereby effectively driving the rectangles toward a center point of the bounding box.

4. The method as in claim 1, wherein the predetermined penalty value has an initial value of 100.

* * * * *